(12) United States Patent
Bezzam

(10) Patent No.: US 12,153,867 B2
(45) Date of Patent: Nov. 26, 2024

(54) REDUCED-POWER DYNAMIC DATA CIRCUITS WITH WIDE-BAND ENERGY RECOVERY

(71) Applicant: REZONENT CORPORATION, Los Altos, CA (US)

(72) Inventor: Ignatius Bezzam, Los Altos, CA (US)

(73) Assignee: REZONENT CORPORATION, Los Altos, CA (US)

( * ) Notice: Subject to any disclaimer, the term of this patent is extended or adjusted under 35 U.S.C. 154(b) by 0 days.

(21) Appl. No.: 18/204,230

(22) Filed: May 31, 2023

(65) Prior Publication Data
US 2023/0306174 A1 Sep. 28, 2023

Related U.S. Application Data

(62) Division of application No. 17/317,500, filed on May 11, 2021, now Pat. No. 11,763,055.

(51) Int. Cl.
| | |
|---|---|
| G06F 30/373 | (2020.01) |
| G06F 30/327 | (2020.01) |
| G06F 30/35 | (2020.01) |
| G06F 30/36 | (2020.01) |
| G06F 119/06 | (2020.01) |
| H02M 7/48 | (2007.01) |
| H03K 5/15 | (2006.01) |
| H03K 19/00 | (2006.01) |
| H03K 19/096 | (2006.01) |

(52) U.S. Cl.
CPC .......... *G06F 30/373* (2020.01); *G06F 30/327* (2020.01); *G06F 30/35* (2020.01); *G06F 30/36* (2020.01); *H03K 19/0019* (2013.01); *H03K 19/0963* (2013.01); *H03K 19/0966* (2013.01); *G06F 2119/06* (2020.01); *H02M 7/4826* (2013.01); *H02P 2201/05* (2013.01); *H03K 5/15* (2013.01)

(58) Field of Classification Search
USPC ........................................................ 716/110
See application file for complete search history.

(56) References Cited

U.S. PATENT DOCUMENTS

| | | | | |
|---|---|---|---|---|
| 8,164,159 | B1* | 4/2012 | Armstrong | ........... H03B 5/1234 |
| | | | | 257/659 |
| 8,227,892 | B2* | 7/2012 | Chang | ....................... H03L 7/23 |
| | | | | 257/659 |
| 11,023,631 | B2* | 6/2021 | Bezzam | ............. H03K 19/0963 |
| 11,763,055 | B2* | 9/2023 | Bezzam | ................ G06F 30/373 |
| | | | | 716/110 |
| 2008/0272441 | A1* | 11/2008 | Sorrells | ................... H04L 25/08 |
| | | | | 257/E21.409 |

(Continued)

*Primary Examiner* — Mohammed Alam

(57) ABSTRACT

Reduced-power dynamic data circuits with wide-band energy recovery are described herein. In one embodiment, a circuit system comprises at least one sub-circuit in which at least one of the sub-circuits includes a capacitive output node that is driven between low and high states in a random manner for a time period and an inductive circuit path coupled to the capacitive output node. The inductive circuit path includes a transistor switch and an inductor connected in series to discharge and recharge the output node to a bias supply. A pulse generator circuit generates a pulse width that corresponds to a timing for driving the output node.

8 Claims, 11 Drawing Sheets

(56) References Cited

U.S. PATENT DOCUMENTS

| | | | |
|---|---|---|---|
| 2014/0035702 A1* | 2/2014 | Black | H03H 7/075 |
| | | | 333/186 |
| 2014/0152337 A1* | 6/2014 | Ding | G01R 31/2644 |
| | | | 438/11 |
| 2019/0095568 A1* | 3/2019 | Bezzam | G06F 30/373 |
| 2021/0264083 A1* | 8/2021 | Bezzam | H03K 19/0966 |

* cited by examiner

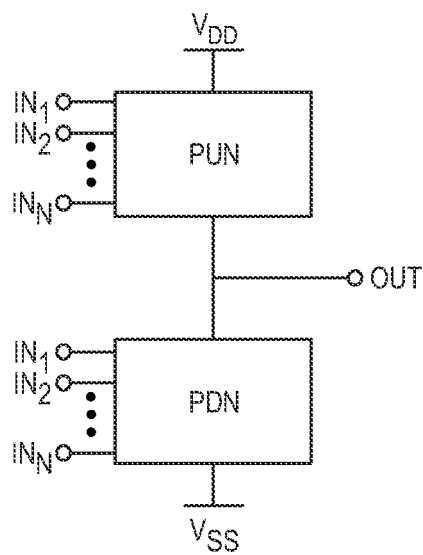
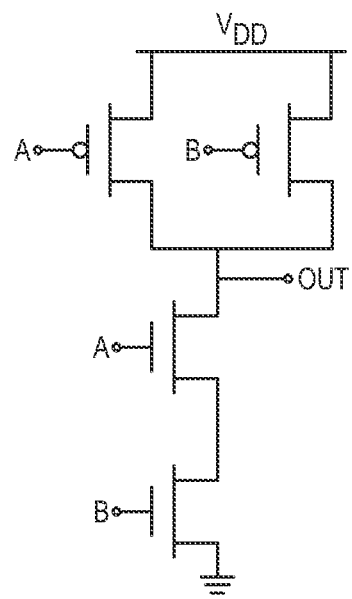
FIG. 1A
(Prior Art)
FIG. 1B
(Prior Art)
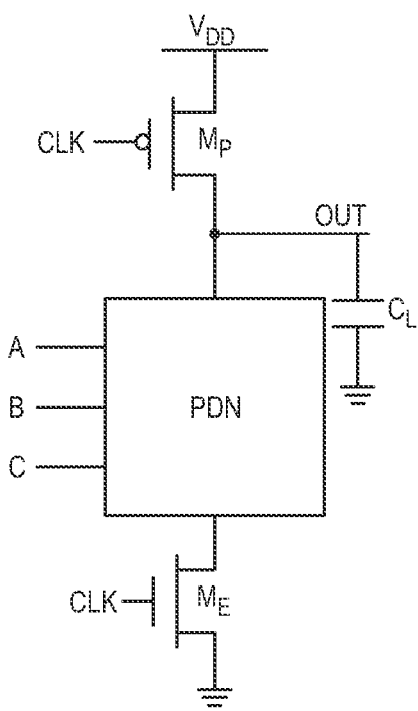
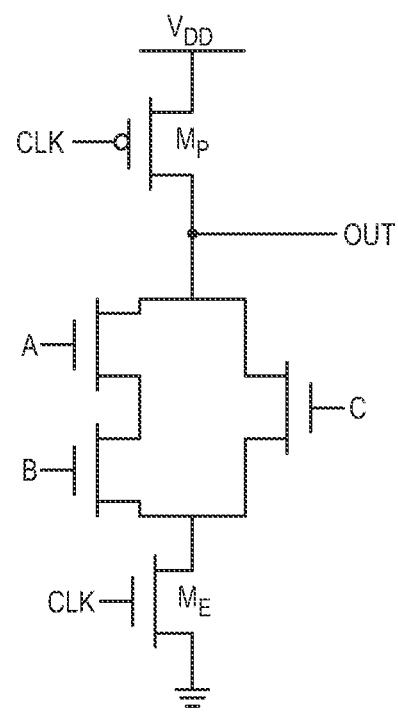
FIG. 2A
(Prior Art)
FIG. 2B
(Prior Art)

REDUCED-POWER DYNAMIC DATA CIRCUITS WITH WIDE-BAND ENERGY RECOVERY

RELATED APPLICATIONS

This application claims the benefit of U.S. Non-Provisional application Ser. No. 16/024,613, filed on Jun. 29, 2018, which claims the benefit of U.S. Provisional Application No. 62/563,028, filed on Sep. 25, 2017, the entire contents of which are hereby incorporated by reference.

TECHNICAL FIELD

The present invention relates generally to the design of integrated electrical circuits and integrated electrical circuit systems. Specifically, embodiments of the present invention pertain to the design of on-chip circuits that include, but are not limited to, digital circuits, signalling circuits, data processing circuits, latches, timing circuits, and logic circuits.

BACKGROUND

The present invention relates generally to the design of integrated electrical circuits and integrated electrical circuit systems. Specifically, embodiments of the present invention pertain to the design of on-chip circuits that include, but are not limited to, digital circuits, signalling circuits, data processing circuits, latches, timing circuits, and logic circuits. A static logic circuit has an NMOS pull-down network (PDN) and a complementary PMOS pull-up network (PUN). An example is shown in FIG. 1. Static logic is "inverting" because a TRUE result in the NMOS logic pull-down network returns an output voltage that is a low state (Out=0). Static logic is widely used yet has significant disadvantages with regards to area and speed. The PUNs in static logic not only consume area but also slow down switching, much more than PDNs, in planar silicon processing technologies.

An example basic CMOS static logic gate is illustrated in FIG. 1A having a generic circuit with n input gates to its PDN. FIG. 1B shows a specific example of static logic for the Boolean function Out=$\overline{A \cdot B}$, a NAND gate.

Now, in contrast to static logic, dynamic logic is driven by a clock signal and does not use a complementary PMOS pull-up network. Thus, it requires only a single PMOS device. With this, dynamic logic is faster and has far fewer transistors. However, dynamic logic employs a pre-charging phase, which itself consumes power after every evaluation especially when the output is in the low state (dynamic power consumption). Moreover, there are timing issues associated with dynamic logic, to be discussed later in this disclosure.

An example of a basic CMOS dynamic logic gate is illustrated in FIG. 2A having a generic circuit with three input gates to its PDN. FIG. 2B shows a specific example of dynamic logic for the Boolean function Out=$\overline{(A \cdot B)+C}$.

A generic dynamic logic circuit is shown in FIG. 2A. As the clock signal CLK goes low, PMOS transistor Mp turns on, NMOS transistor Me turns off, and the output is pre-charged to a high state. As the clock goes high, NMOS transistor Me turns on, Mp turns off, and the output's voltage is either maintained or discharged to a low state, depending on inputs to the PDN. When Mp is turned on and Me is turned off, this part of the cycle is called "Pre-charge." When Me is turned on and Mp is turned off, this part of the cycle is called "Evaluation."

FIG. 2B shows another diagram of a dynamic CMOS logic gate, along with an example of a gate that evaluates the logical (Boolean) function Out=$\overline{(A \cdot B)+C}$. As the clock signal CLK goes low, PMOS transistor Mp turns on, NMOS transistor Me turns off, and the output node "Out" becomes pre-charged to a high state (at Vdd or near Vdd). As CLK goes high, NMOS transistor Me turns on, and the evaluation of the inputs of the pull-down network (PDN) occurs. The voltage across the output node and ground is the voltage across the load capacitance $C_L$. The charge on the node Out may or may not be discharged to ground during evaluation, depending on the logic presented at the inputs to the PDN. If the charge is discharged during evaluation, then the state of the output node Out will transition to low, wasting energy. Just like static logic, dynamic logic is "inverting" because a TRUE result in the PDN produces an output voltage that is low (Out=0). Even though the PDN has an increased number of NMOS devices (for a more complicated function), there is only a single PMOS device for pull-up.

In summary, dynamic logic is an established and widely known clock-gated circuit methodology that is used to improve speed, reduce transistor count, and avoid PMOS pull-up networks (PUNS) that are used for static logic. This switching of the output back and forth from high-to-low and low-to-high leads to wasteful power consumption and circuit heating. Moreover, for a given output time frame that is in a low state over many clock cycles, the circuit will draw (consume) energy from Vdd to ground for each clock cycle.

The pre-charge for dynamic logic occurs at every cycle. In other words, there is a pull-up event on all cycles. If the output node Out is already high, the pre-charge phase will consume least energy. If the output node is low, the pre-charge phase will consume most energy. Thus, dynamic logic has higher switching power than static logic.

Dynamic logic can, under certain circumstances, default to behave as a clock circuit, in which the output node switches from low-to-high for every clock cycle, at the clock frequency $f_{CLK}$. For example, this can happen when the results of the PDN are steadily low over timeframes that persist for multiple clock cycles. In these cases, the output node Out is discharged and then recharged on every clock cycle. Likewise, if the results of the PDN are steadily high over multiple clock cycles, pre-charging still occurs on every clock cycle, to refresh the output node in case of charge leakage.

SUMMARY

Reduced-power dynamic data circuits with wide-band energy recovery are described herein. In one embodiment, a circuit system comprises at least one sub-circuit in which at least one of the sub-circuits includes a capacitive output node that is driven between low and high states and an inductive circuit path coupled to the capacitive output nod. The inductive circuit path includes a transistor switch and an inductor connected in series to discharge and recharge the output node to a bias supply. A pulse generator generates a pulse width that corresponds to a timing for driving the output node.

BRIEF DESCRIPTION OF THE DRAWINGS

An example basic CMOS static logic gate is illustrated in FIG. 1A having a generic circuit with n input gates to its PDN.

FIG. 1B shows a specific example of static logic for the Boolean function Out=$\overline{A \cdot B}$, a NAND gate.

A generic dynamic logic circuit is shown in FIG. 2A.

FIG. 2B shows another diagram of a dynamic CMOS logic gate, along with an example of a gate that evaluates the logical (Boolean) function Out=$\overline{(A \cdot B)+C}$.

Figure 3:
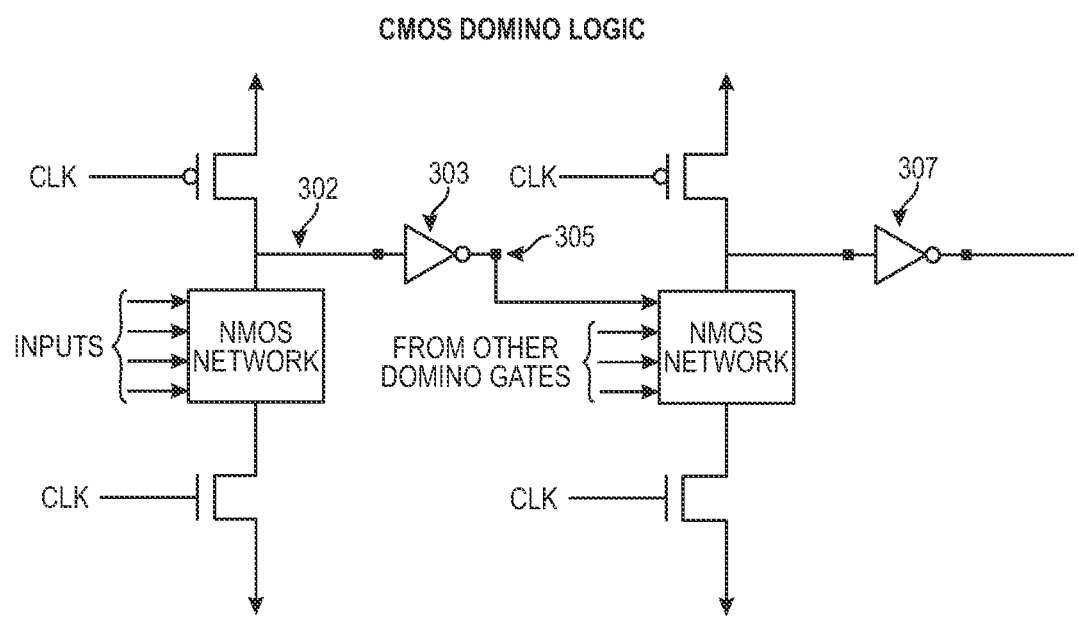

FIG. 3 shows an example of Domino Logic in accordance with one embodiment.

Figure 4A:
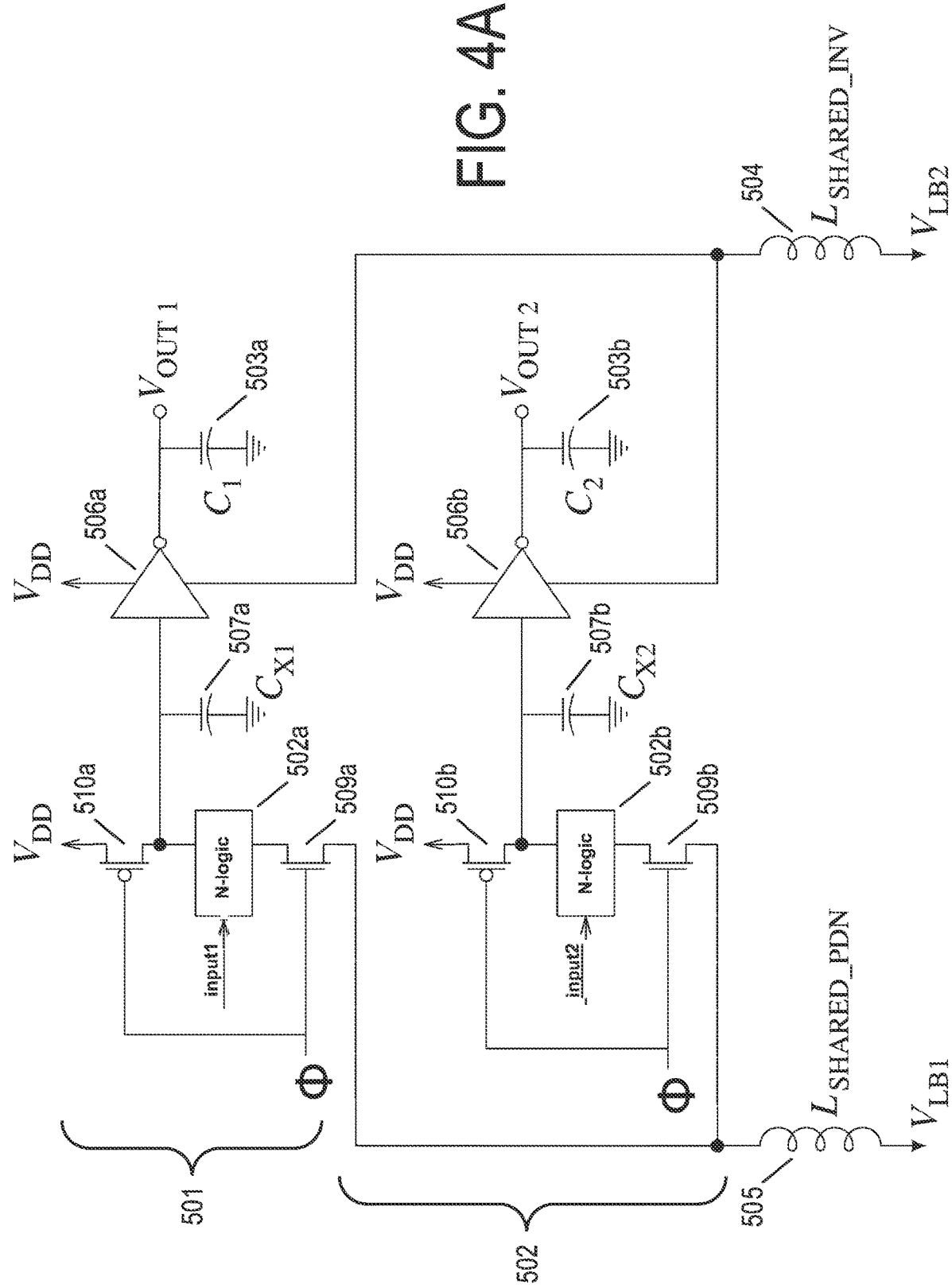

FIG. 4A shows resonant dynamic logic (RDL) as applied to Domino Logic circuits in accordance with one embodiment.

Figure 4B:
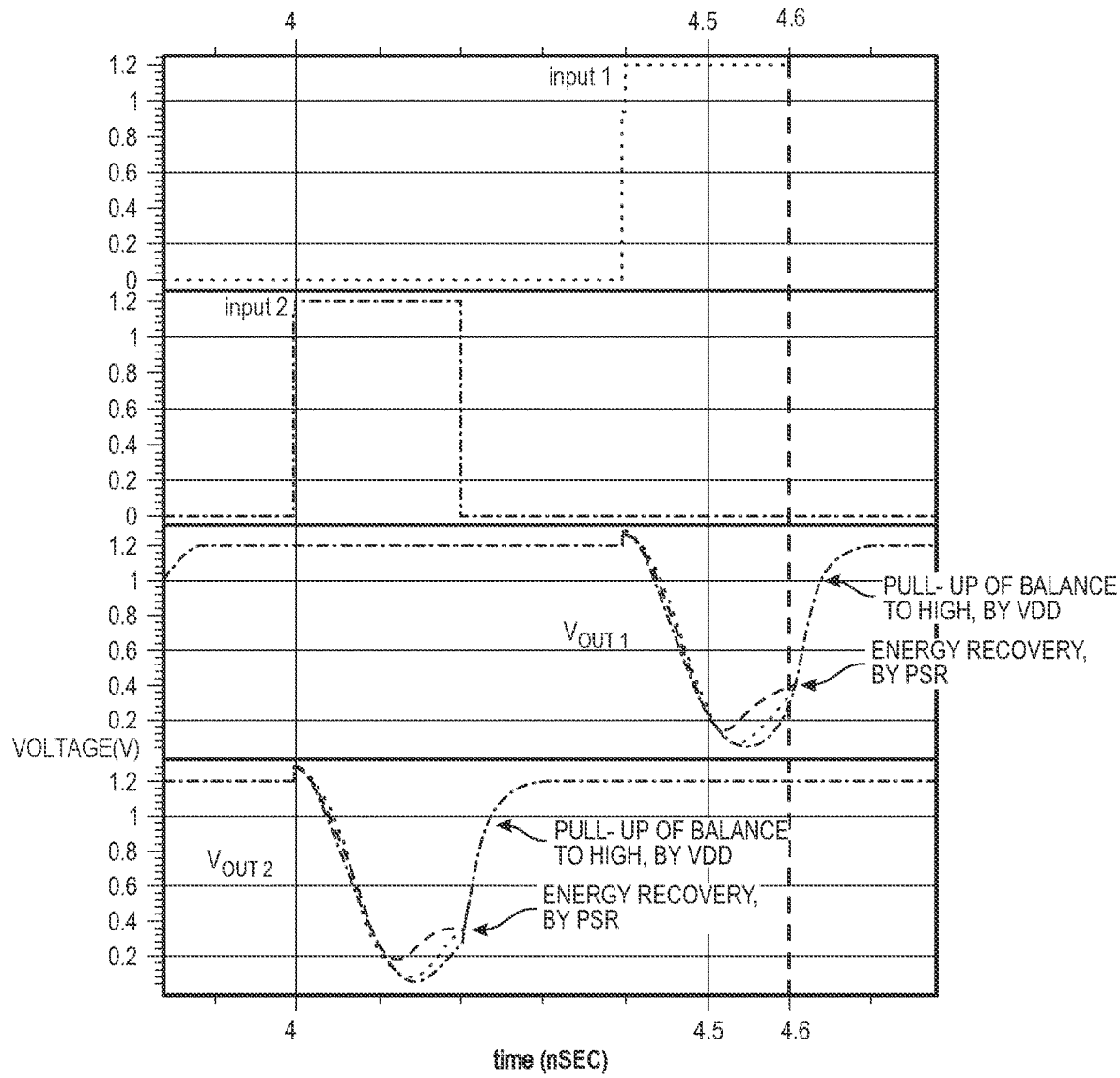

FIG. 4B shows simulation results for resonant dynamic logic (RDL) as applied to a system of two independent inverter circuits (non-overlapping inputs) in accordance with one embodiment.

Figure 5:
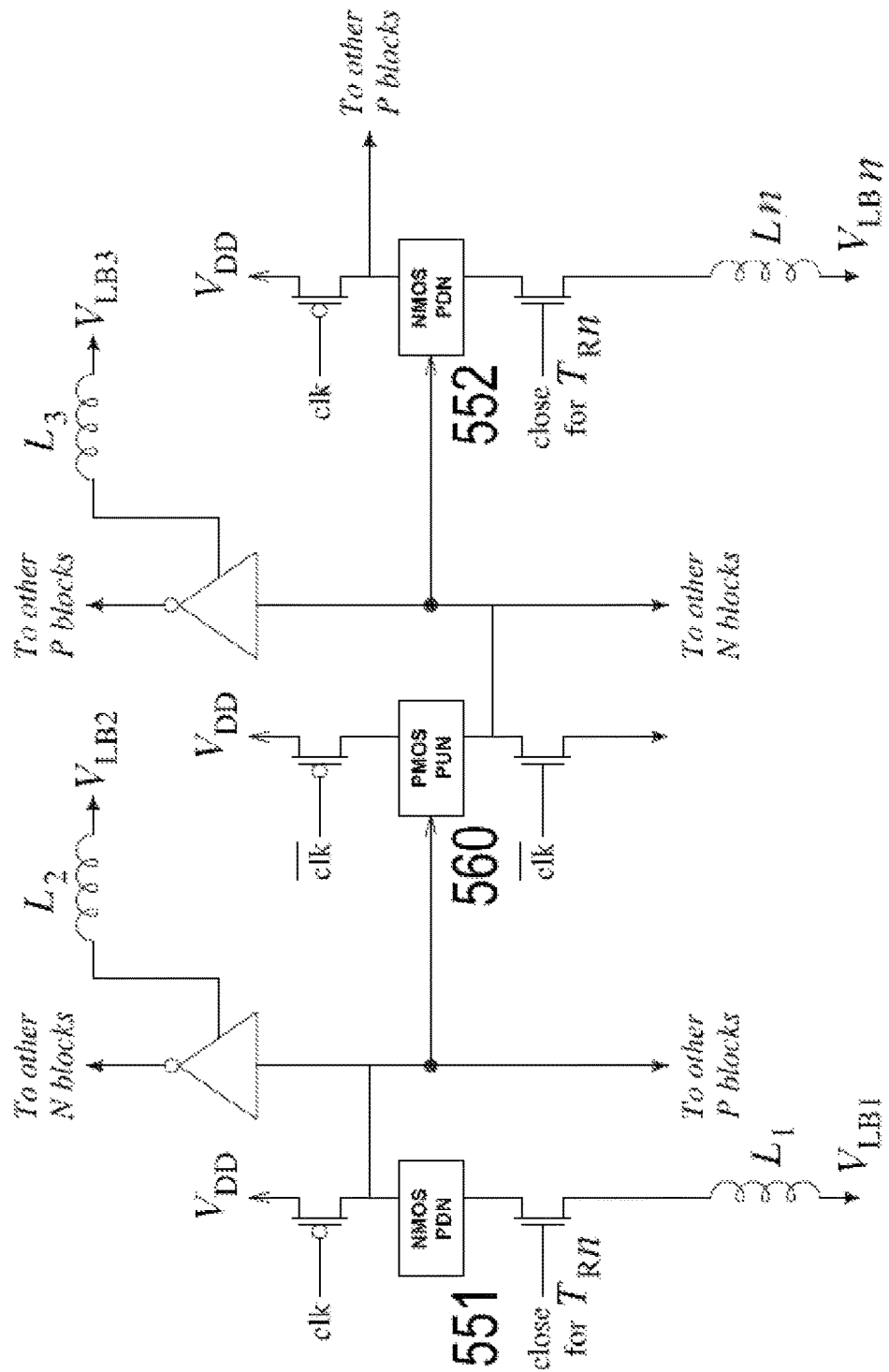

FIG. 5 shows resonant dynamic logic (RDL) as applied to circuits of the class that is called "N-P Domino Logic" in accordance with one embodiment.

Figure 6:
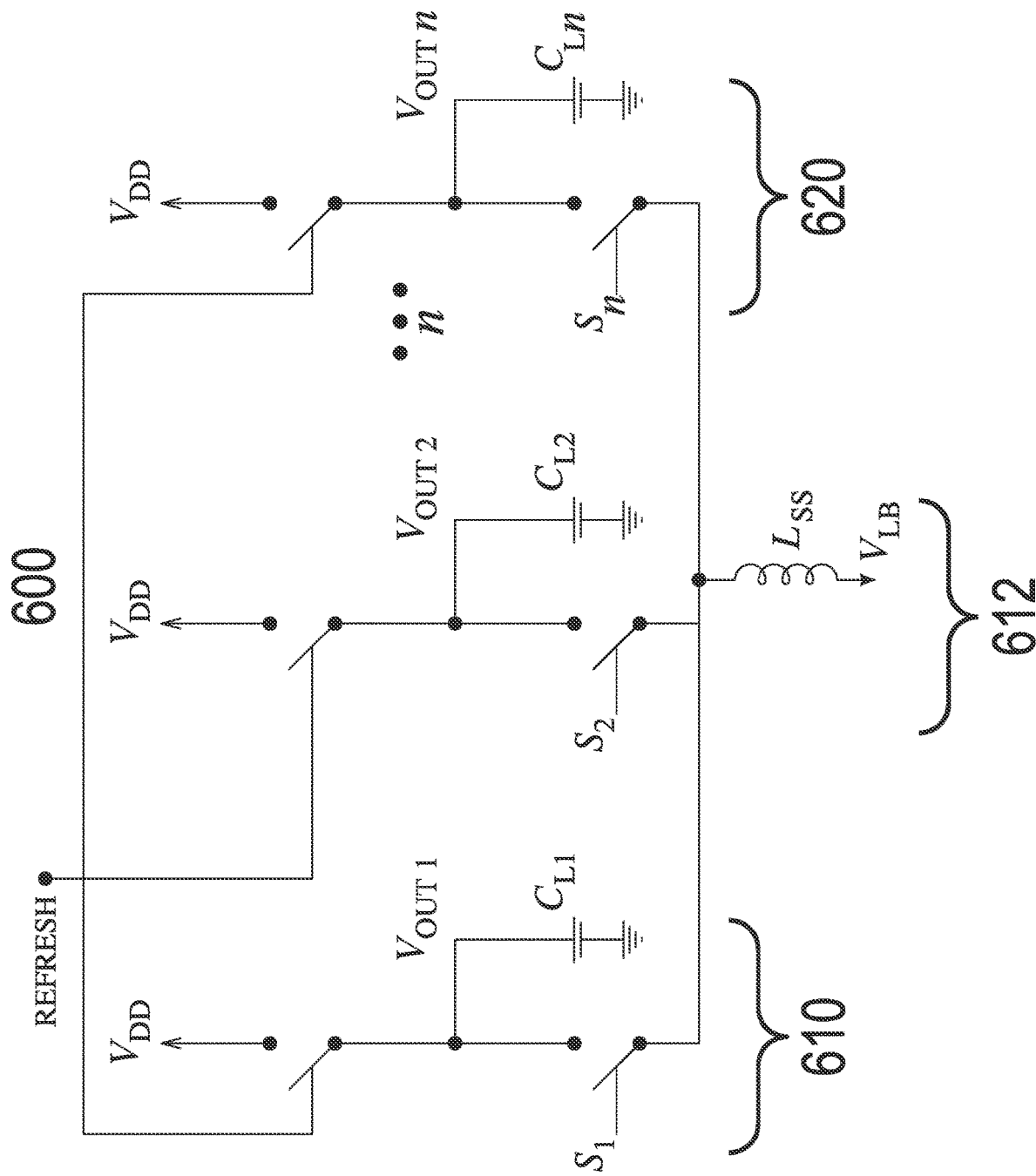

FIG. 6 shows a digital logic driver having shared-inductor series resonant (SI-PSR) topology in accordance with one embodiment.

Figure 7:
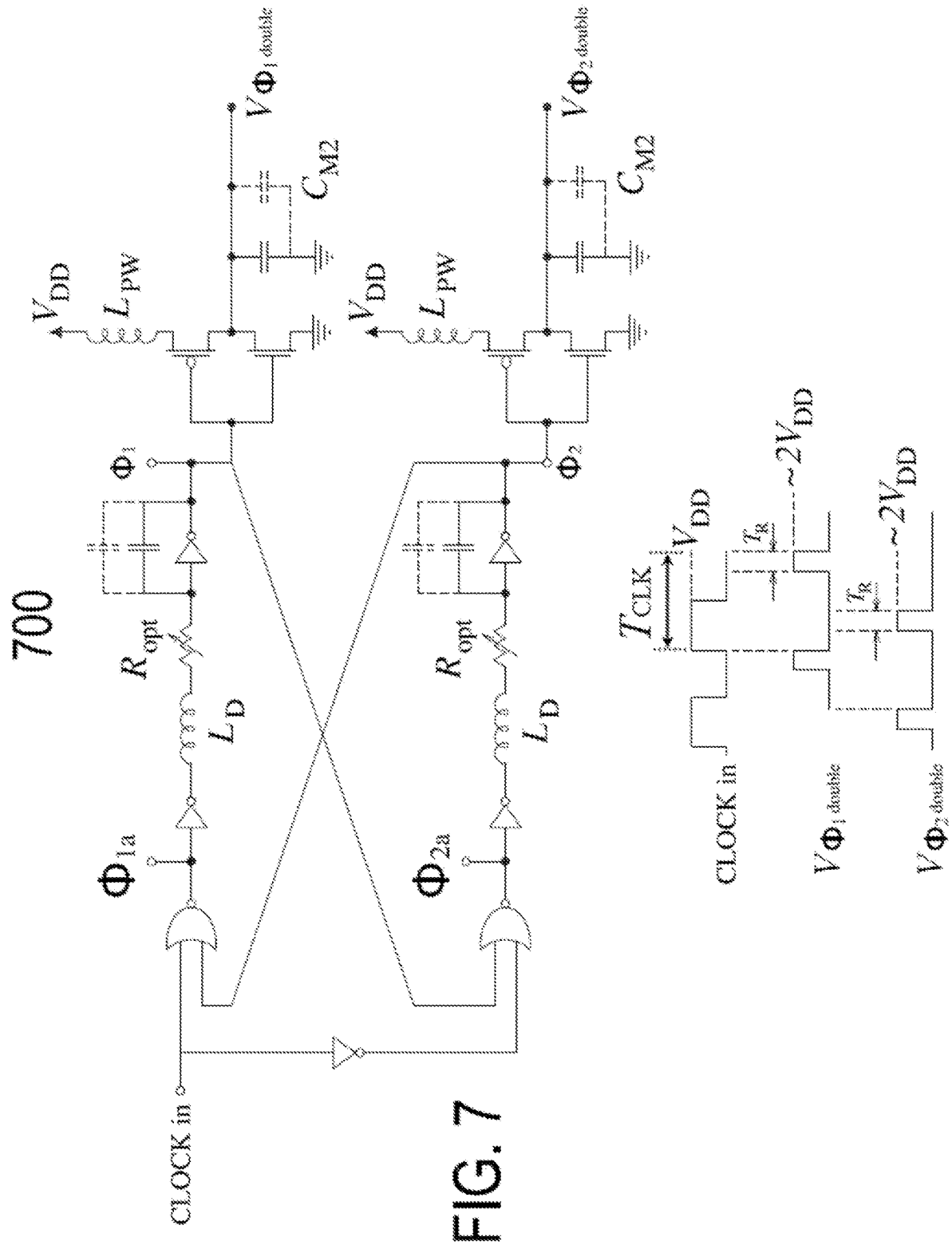

FIG. 7 shows an embodiment of a controller circuit for setting and trimming pulse & timing parameters (without disrupting critical signal path) in accordance with one embodiment.

Figure 8A:
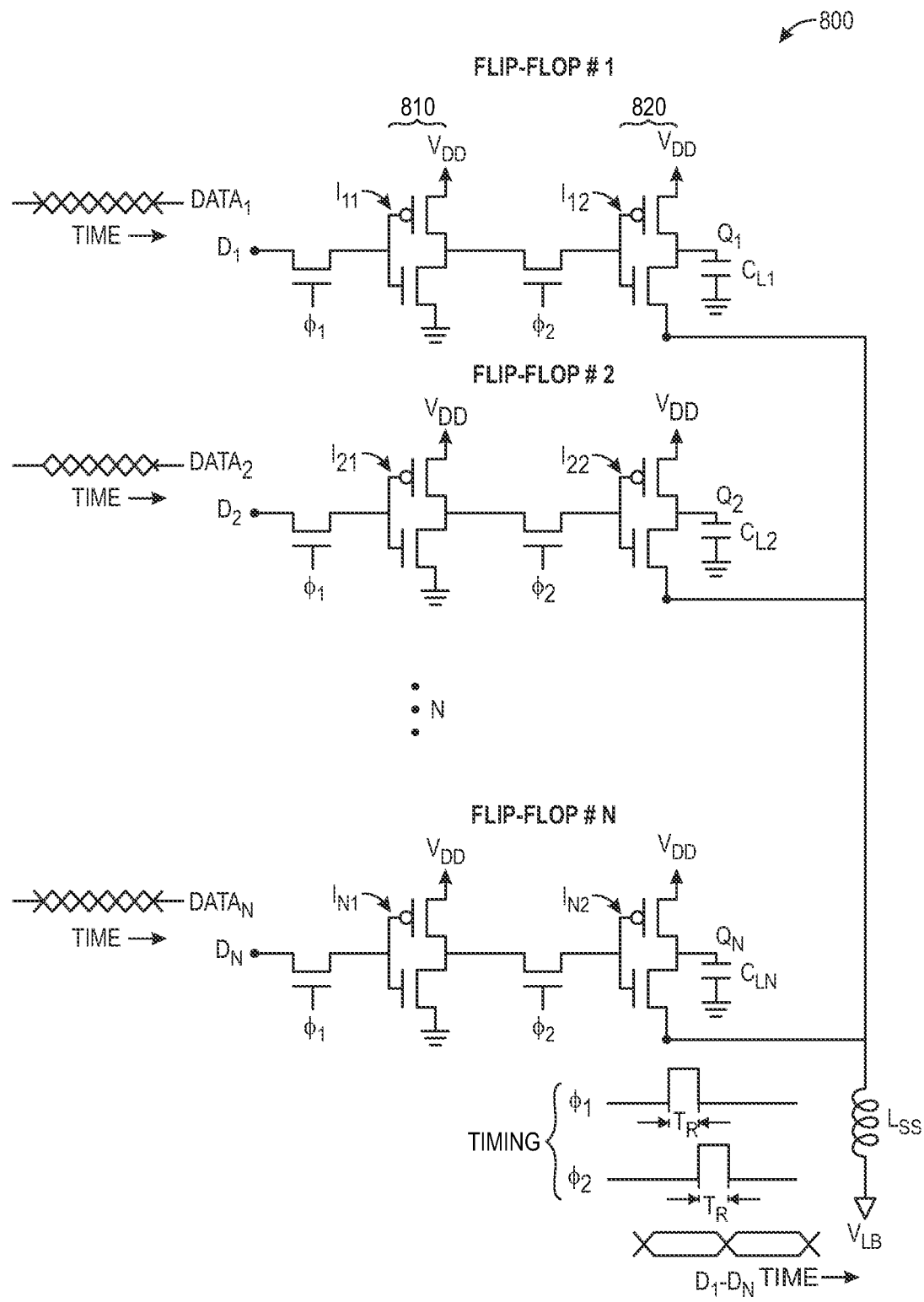

FIG. 8A shows resonant dynamic logic (RDL) as applied to flip-flops in accordance with one embodiment.

Figure 8B:
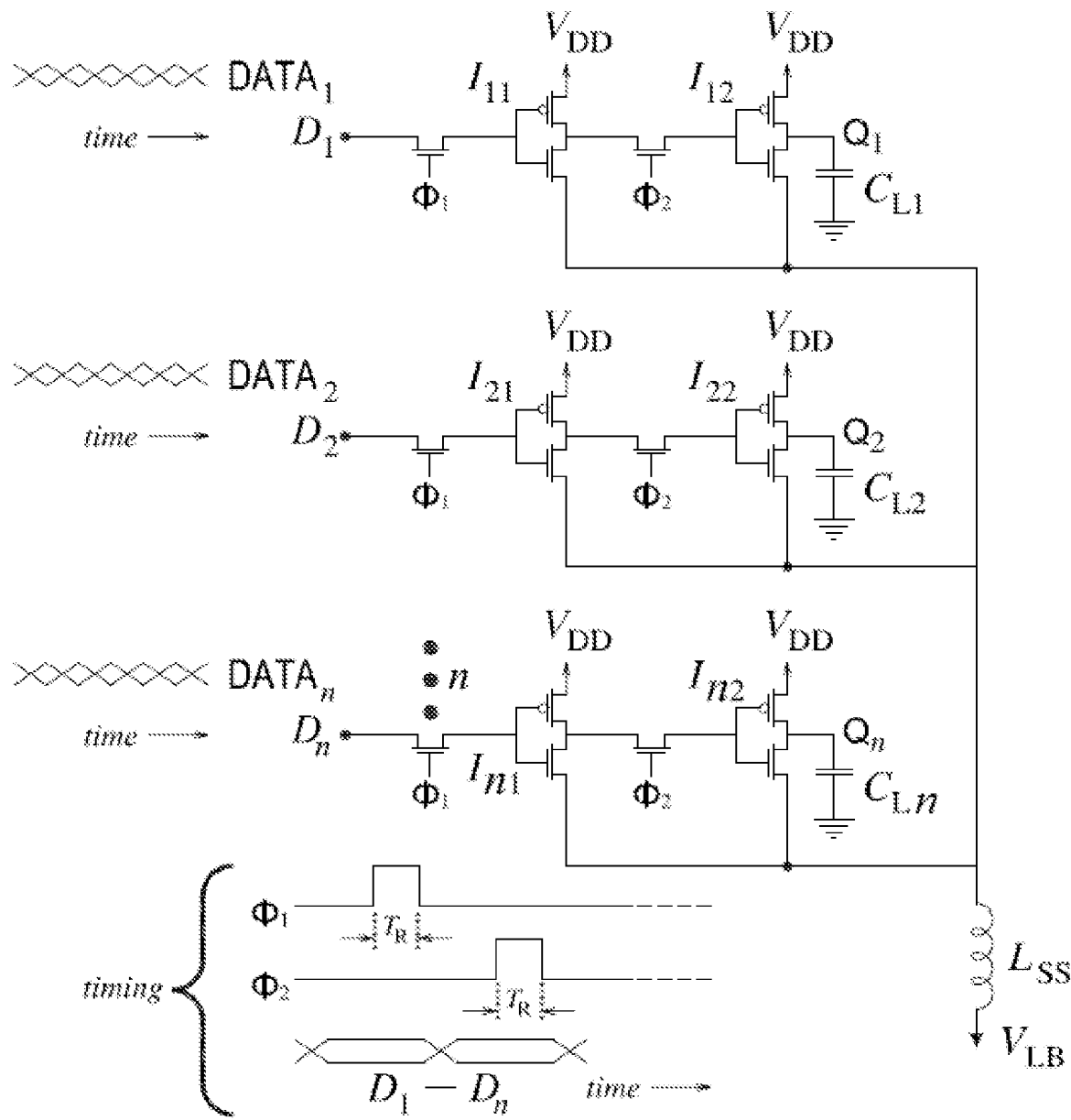

FIG. 8B shows resonant dynamic logic (RDL) as applied to flip-flops in accordance with one embodiment.

Figure 9:
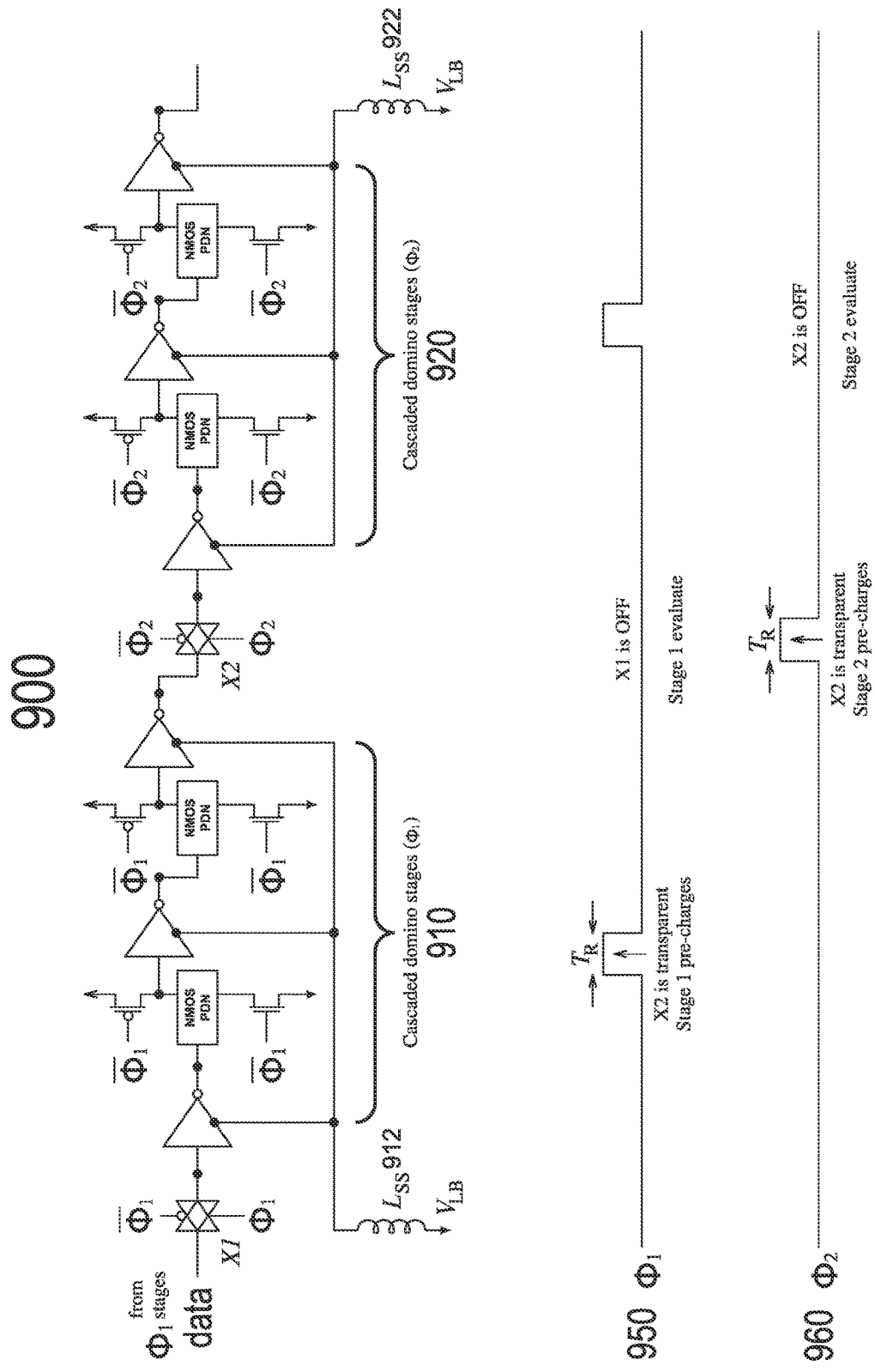

FIG. 9 illustrates an example of pseudo 2-phase domino resonant dynamic logic (RDL) in accordance with one embodiment.

Figure 10:
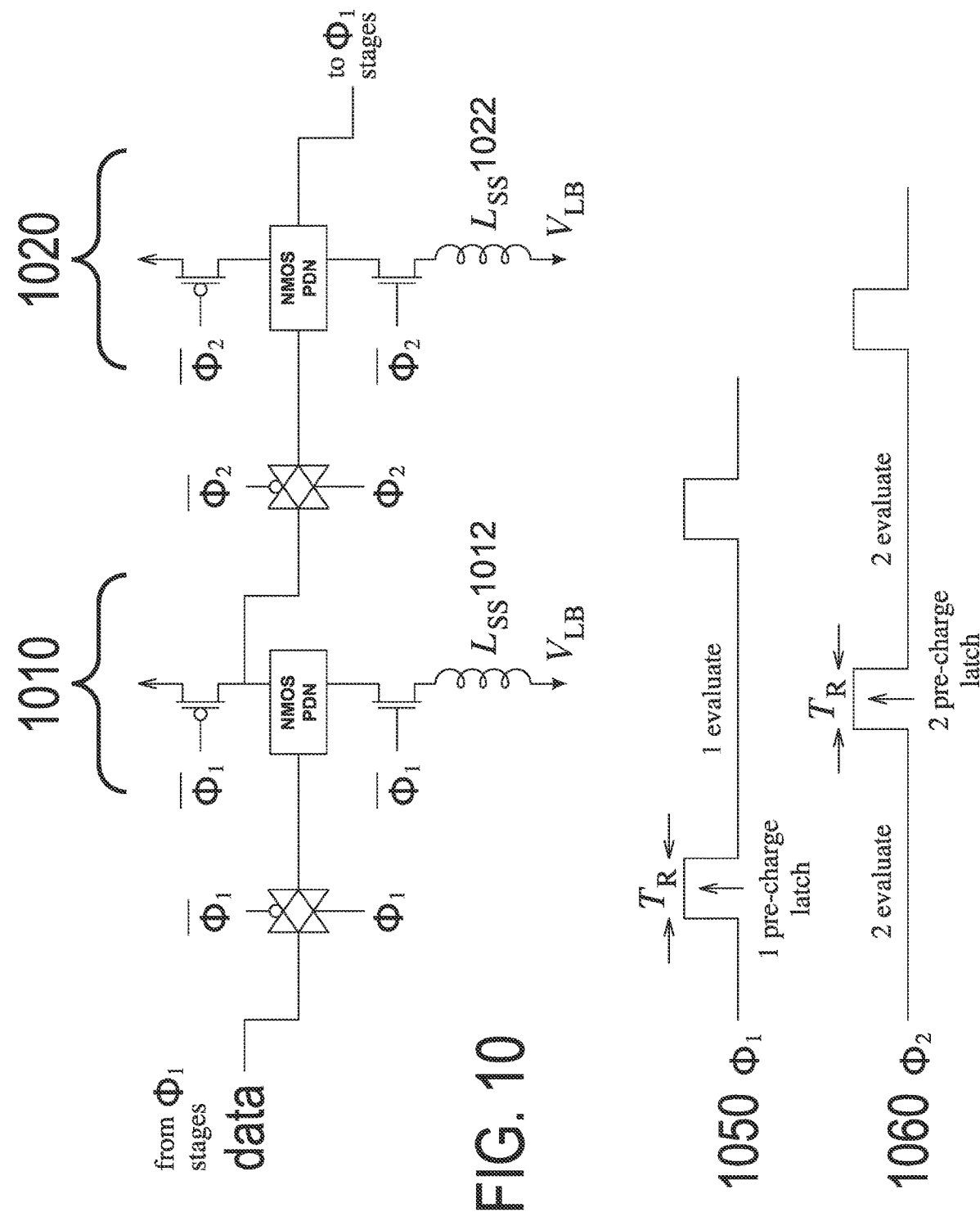

FIG. 10 illustrates an example of pseudo 2-phase domino resonant dynamic logic (RDL) in accordance with one embodiment.

The headings provided herein are for convenience only and do not necessarily affect the scope or meaning of the claimed invention. In the drawings, the same reference numbers and any acronyms identify elements or acts with the same or similar structure or functionality for ease of understanding and convenience.

DETAILED DESCRIPTION OF THE INVENTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Methods and devices are presented for reducing heat-producing power consumption for circuits with rapidly switching outputs such as those used by dynamic logic and dynamic data storage circuits. Reducing wasteful energy dissipation in driving large capacitive loads that produce heat lessens the requirements for expensive cooling to lower the resultant high temperatures. These methods reuse energy, that would otherwise be wasted, by collecting the electric energy in one or more shared inductors connected to the pull-down terminal, without disturbing the sensitive high-frequency (HF) output signal node. To recover and reuse the energy of the switching output's energy-draining load capacitance, which would otherwise be wasted to ground, one or more shared inductive elements intermittently resonate, as needed, with an aggregate of one or more load capacitances. The aggregate of load capacitances is comprised of one or more independent data circuits connected together and further connected to an AC ground path of the standard switching circuit. Thus, the inductive element is disconnected from the switching output and does not corrupt the switching circuit's output node. When the resonant element L is connected, it permits a low-impedance path for the charging and discharging of the output node. Such architecture is applicable for data and logic circuits with extensive semiconductor switching circuitry consuming high dynamic power for low skew operation such as for microprocessor CPUs, GPUs, ASICs, SOCs. In sum, this disclosure is about resonant energy reuse for digital logic, latches, and data circuits having random non-repetitive data during certain time periods and possibly having repetitive data during other time periods. Embodiments of the invention operate over the circuit's full range of clock frequencies and does not impede other methods of power reduction like Dynamic Voltage and Frequency Scaling (DVFS).

In contrast, for logic circuits, the activity factor α depends on the logic conditions presented to the inputs of the PDNs. For dynamic logic, the outputs can be repeatedly transitioning from low-to-high even if inputs are not switching over any given timeframe. In other words, a given PDN can be in a steady "True" state (low output state) from clock-cycle to clock-cycle, yet the output will transition between 0 and 1 for each clock cycle. For this extreme case, the maximum alpha for dynamic data circuits is 0.5, and is thus written as $P_{DYNAMIC} = \frac{1}{2}\alpha CV_{DDfCLK}^2$.

Now, consider the statistical factor alpha a for logic circuits, beginning with static logic. The non-resonant (NR) power for static logic is given by standard expression, with data switching at most one-half the clock rate, with an activity factor α as, $$P_{Static} = \frac{1}{2}\alpha CV_{DD}^2 f_{CLK} + \frac{n}{33}\alpha CV_{DD}^2 f_{CLK} \quad (6.1)$$

The second term accounts for the n-input logic processing. The activity factor indicates the fraction of times that the output signal goes high. Typically, the input capacitance is $\frac{1}{33}$ of the output device capacitance (not the parasitic load capacitance). While this factor varies from process-to-process, it may be considered when a large scale is used (millions of devices).

For non-resonant dynamic logic, power is only consumed on low-going output signals, hence the complementary factor (1−α), but at twice the rate because signals are pulled high immediately after being pulled low. This would give the power for an n-bit domino style dynamic logic as, $$P_{Domino} = (1-\alpha)CV_{DD}^2 f_{CLK} + \frac{n+1}{33}\alpha CV_{DD}^2 f_{CLK} \quad (6.2)$$

This includes the second term for the extra power for the n input logic pre-processing combined with the clock. Thus, while dynamic logic can give fastest data rates and smallest propagation delays possible for a given clock, it does not give the lowest power possible for any data rate, because the data is toggled on the high capacitance output node like a clock. In fact, the power is almost double for an even-probability case of $\alpha=0.5$.

In this disclosure, Resonant Dynamic Logic (RDL) examples are shown for logic circuits and data latches. The concepts of Shared Inductor Pulsed Series Resonance (SI-PSR) and its application to so-called Domino Logic are discussed first. After considering SI-PSR and Domino Logic, other classes of circuits are presented and discussed.

This disclosure discusses resonant energy recovery methods (energy recycling methods) for dynamic logic circuits and latch circuits with the goals of improving performance, lowering power consumption, and reducing heating. A general name for this type of resonant energy recovery, as applied to logic and latch circuits, is Resonant Dynamic Logic (RDL). RDL can employ a circuit design approach called "Shared Inductor Pulse Series Resonance" (SI-PSR), to be described later in this disclosure.

The present invention (RDL) reduces electrical energy consumption in dynamic logic circuits, with respect to the static logic counterparts. It does this by recovering the energy dissipated in multiple logic circuits transitioning from high-to-low states, and reusing it wherever a low-to-high transition is required. This recovery is done by converting the electrical energy to magnetic energy in the high-to-low transition. The energy is then reused on any output node that requires a low-to-high transition. This recovery and reuse of electrical energy results in reduced power consumption and hence reduced heating, because energy is not wasted. Thus, described herein are digital data-circuit drivers that can reuse electrical energy at several load capacitances, the load capacitance as part of a signal path, without interfering with the signal path, the digital logic driver comprising a resonant inductor element whose size and cost is greatly reduced by means of sharing with multiple logic drivers. The digital data-circuit drivers have random non-repetitive data during certain time periods and possibly have repetitive data during other time periods.

The descriptions of the devices and methods herein are mostly for use in on-chip logic circuits, data-path circuits, and other types of circuits where the input states and/or output states of the circuit are required to switch their voltages back-and-forth frequently between high and low outputs, even when they are independently switching. Embodiments of the invention are capable of operating over a circuit's entire range of clock speeds.

In this disclosure, RDL examples are shown for dynamic logic circuits and dynamic data latches. The concepts of Shared Inductor Pulsed Series Resonance (SI-PSR) as applied to widely-known prior art (Domino Logic) are discussed here first. After considering an RDL implementation of Domino Logic, other classes of circuits are presented and discussed, including N-P Domino CMOS Logic, Clocked D-Latches, Dynamic D-Latches, Pseudo 2-phase Dynamic Logic, and Pseudo 2-phase Domino Logic.

It would be useful to be have a range of electrical energy recovery and reuse methods for dynamic logic circuits to improve energy efficiency while giving higher speed performance. This would greatly extend the range of applications for Dynamic Logic and encourage its widespread use, facilitating the implementation of high-performance, lower-power-consuming chips with less circuit heating.

Other features and aspects will become evident from the description herein, including the drawings, and the claims.

Table 1 lists some of the abbreviations and nomenclature used in this disclosure.

TABLE 1

Nomenclature Summary

| Nomenclature: | | | Average Power |
|---|---|---|---|
| C | Capacitor | $P_{avg}$ | per cycle |
| CDN | Clock Distribution Network | | |
| $C_L$ | Load Capacitor | $P_{GSR}$ | GSR Power |
| CMOS | Complementary Metal Oxide Semiconductor | PLS_CLK | Clock Pulse Stream |
| $C_{OUT}$ | Output Capacitor | PMOS | P-type Metal Oxide Semiconductor |
| | | $P_{NR}$ | Non-Resonant Power |
| D | Data input of a flip-flop | PPA | Power, Performance and Area |
| DC | Direct Current | $P_{PSR}$ | PSR Power |
| DCR | DC resistance of inductor | PSR | Pulsed Series Resonance |
| DDR | Double Data Rate | Q (italicized) | Quality factor |
| DET | Dual Edge Triggering | Q | Output of flip-flop |
| DVFS | Dynamic Voltage Frequency Scaling | $Q_C$ | Component Quality factor of Capacitor C |
| $E_C$ | Energy stored on capacitor C per cycle | $Q_L$ | Component Quality factor of Inductor L |
| EMI | Electro-Magnetic Interference | $R_d$ | pull-Down switch Resistance |
| | | RDL | Resonant Dynamic Logic |
| ESR | Electrical Series Resistance of Capacitor | RF | Radio Frequency |
| $E_{VDD}$ | Energy drawn from $V_{DD}$ supply per cycle | $R_p$ | Inductor parallel Resistance equivalent to DCR |
| $f_{CLK}$ | Clock Frequency | $R_r$ | Resonance on-off switch Resistance |
| $f_R$ | Frequency of damped oscillations | $R_u$ | pull-Up switch Resistance |
| $f_{RES}$ | ideal Frequency of Resonance | $R_w$ | Interconnect Wire Resistance |
| GSR | Generalized Series Resonance | SCB | Sector Clock Buffers |
| | | SI-PSR | Shared inductor PSR |
| IC | Integrated Circuit | SoC | System on Chip |
| $i_L$ | Inductor Current | $T_{CLK}$ | Clock Period |
| INV | Standard medium Inverter driving 1pF load | $T_{PW}$ | Pulse Width Time |
| IR | Intermittent Resonance | TSPC | True Single Phase Clocking |
| | | $T_R$ | Input pulse width, Output pulse width, also called $T_{RES}$ |
| | | $T_{RES}$ | Input pulse width, Output pulse width, also called $T_R$ |
| L | Inductor | $V_C$ | Capacitor Voltage |
| $L_{SHARED}$ | Inductor that is shared by independent circuits for pulsed series resonance | $L_S$ | Series Inductor |
| | | $L_{SS}$ | Shared series inductor, same as $L_{SHARED}$ |

TABLE 1-continued

Nomenclature Summary

| Nomenclature: | | | Average Power |
|---|---|---|---|
| C | Capacitor | $P_{avg}$ | per cycle |
| LC | Inductor (L) Capacitor (C) series/parallel combination | $V_{DD}$ | Power Supply voltage |
| LCB | Local Clock Buffers | $V_{in}$ | Input Voltage |
| MEMS | Micro-Electro-Mechanical Systems | $V_{LB}$ | Inductor Bias Voltage |
| MS | Master Slave | $V_{OH}$ | logic Output High Voltage |
| NEMS | Nano-Electro-Mechanical Systems | $V_{OL}$ | logic Output Low Voltage |
| NMOS | N-type Metal Oxide Semiconductor | $V_{OUT}$ | Output Voltage |
| NR | No Resonance | µ | micro meter units |
| Out | Output Node | | |
| $P_{avg}$ | Average Power per cycle | τ | time constant |

Cascading of Dynamic Circuits—Domino Logic, and the Application of embodiments of the Present Invention to Domino Logic: To introduce an example of the present invention, consider cascaded dynamic logic circuits. For the general implementation of dynamic logic, it is important to prevent inadvertent discharge of cascaded logic stages. Logic circuits in a cascaded system are timed by the same clock. A "high" state on the Out node of a first gate may cause the next gate to discharge prematurely, before the first gate has had time to settle to its correct output state. To avoid this, a static inverter can be inserted between gates so that the pre-charge states presented at the inputs of the next PDN stage are always zero. Thus, each logic stage needs two parts: a dynamic logic stage followed by an inverter. This is called "Domino Logic," and a diagram is shown in FIG. 3.

The inverters that are used for the domino logic drive the large load capacitances, including interconnect capacitances and fan-outs. Expanding further on the concepts of internal capacitance and load capacitance, the output of the first gate, at node 302 in front of the inverter 303, drives smaller internal capacitance leading up to inverter 303. In contrast, the output of the inverter 303 drives the (and significantly larger) load capacitance of its output node 305. The inverters 305 and 307 make sure that the inputs to a next logic block have a logic state (e.g., 0) during pre-charge.

FIG. 3 illustrates an example of CMOS Domino-style dynamic logic.

An example of embodiments of the present invention employs shared inductor pulsed series resonance (SI-PSR) in domino logic circuits and is shown in FIG. 4A. SI-PSR circuit 500 features an inductance 504 called $L_{SHARED}$ (also called $L_{SS}$ for "series shared inductor") in series with the pull-down network (PDN), and resonates in series with the output load capacitance 503a, 503b when connected. The other end of the inductor is connected to a bias node ($V_{LB2}$). The capacitance at the output node (e.g., Vout2) is the total capacitance associated with the logic stage itself, plus all other capacitances that are seen at that node (the total capacitance of the output lines that are to be driven). Thus, the inductor and capacitance form a series tank at resonant frequency $f_{RES}$ that can be connected and disconnected to the output. The mechanism of action for SI-PSR involves connecting the resonant series tank for an optimum duration, so that as the output transitions from high to low, (e.g., from logic state 1→logic state 0), magnetic energy can be established in the inductor and stored in a power supply, and then recovered by way of the inductor to help transition an output back to high, from logic state 0→logic state 1. Energy recovery thus occurs by way of a "recoil current" (or "rebound current") through $L_{SHARED}$.

FIG. 4A illustrates an example of an embodiment of the present invention as applied to domino logic, showing location of two, independent RDL inductors that are each shared by 71 independent logic circuits (in this figure, two logic circuits are explicitly shown; and more than two can be connected in practice).

Some features of the circuit in FIG. 4A include the following: (i) SI-PSR inductors 504, 505 that are series-resonant with the total capacitance of their electrically connected circuit nodes; (ii) sharing of said inductors with independent logic circuits 501 and 502; (iii) inputs from the clock signal φ at a clock frequency $f_{CLK}$; and (iv) two sets of input data signals to each of the two PUNS 502a, 502b (the inputs data signals are labelled in FIG. 4A as input1 and input 2). These input data signals have random non-repetitive data during certain time periods and possibly have repetitive data during other time periods.

Continuing with FIG. 4A, a shared inductance 505 is connected in series with pull-down NMOS transistors 509a and 509b, and another shared inductance 504 is connected in series with the NMOS transistors of each of the two inverters 503a, 503b. Consider each inductor 504, 505, one at a time: for inductance 505, one of its two terminals is connected in series with each of the evaluation transistors 509a, 509b, and its second terminal is connected to inductor bias supply $V_{LB1}$. For inductance 504, one of its two terminals is connected in series with the NMOS transistors of each of the inverters 506a and 506b, and its second terminal is connected to inductor bias supply $V_{LB2}$. The inductor bias supplies $V_{LB1}$ and $V_{LB2}$ can be different and independent.

As discussed earlier, domino-style logic circuits avoid glitches (false signals) in logic operation (logic processing) through the use of inverters between stages. In FIG. 4A, "between-stage" inverters 506a, 506b are shown, as one inverter in each of the two signal lines. However, inverters that are placed in signal lines drive parasitic capacitances and thus consume power. Parasitic capacitance, or "stray capacitance" is an unavoidable and unwanted capacitance in the signal line, caused by the physical properties of the circuit elements, and the physical layout of the circuits. To recover this energy using SI-PSR, the simple inverter is replaced by a SI-PSR circuit on any or all inverter instances. In the case shown in FIG. 4A, an inductor 504 is used, labelled as $L_{SHARED\_INV}$, thereby sharing a single inductor with two logic circuits. The resulting waveforms as shown in the simulations are presented in FIG. 4B. Extending this concept, for larger circuits, an inductor can be shared with a greater number of logic circuits.

In addition, in the example in FIG. 4A, in addition to the first inductor 504, a second inductor 505 (labelled as $L_{SHARED\_PDN}$) is used as an independent SI-PSR circuit in series with each of the two PDNs 502a, 502b, connected to the sources of the two NMOS transistors 509a, 509b that are used for evaluation. Thus there are two implementations of SI-PSR at two separate circuit locations: (i) a shared inductor 504 at the inverters; and (ii) a separate shared inductor 505 at the NMOS transistors. These two implementations of SI-PSR are additive in terms of energy reuse, and are independent of each other.

Here, because more than one logic circuit is sharing a single SI-PSR inductor, a cumulative (aggregate) load capacitance $C_L$ is obtained for resonating with the inductor. For larger systems of logic circuits, where many data lines are shared, this cumulative capacitance is large enough to resonate with a single, shared inductor $L_{SHARED}$ of practical physical size and inductance value. In some embodiments, the value of the inductor is about 0.7 nH, yet the method is robust over a wide range of inductance values. The inductor and the capacitance (LC) form a series resonant frequency that is significantly greater (e.g., at least 3 times, 3 times to 100 times) than a clock frequency, so that the output signal paths are not interfered with and so that effects on skew are minimized.

Embodiments of the invention are capable of operating (providing energy storage and reuse) over all of the clock frequencies that the driver circuits use. Moreover, the pulse input φ for driving 509a, 510a in FIG. 4A can overlap, partially overlap, or not overlap with pulse input φ that is used for driving 509b, 510b.

To summarize some points in the above discussion, and for many examples that use SI-PSR, more than one output node (together with its NMOS transistor) can be connected simultaneously to one terminal of a single inductor. Thus, a plurality of independent logic circuits and data circuits can be connected to one single terminal of a shared SI-PSR inductor. Therefore, $f_{RES}$ is realized from an LC resonant combination of the total load capacitances and the SI-PSR inductor, where one terminal of the inductor is connected to $V_{LB}$, and its other terminal is connected in series with one or more output load capacitances (to form a composite load capacitance). The embodiment shown in FIG. 4A features two independent implementations of SI-PSR applied to two independent domino logic circuits 501 and 502. In general, as described herein, one or more logic or data lines can electrically share a terminal of a SI-PSR inductor.

FIG. 4B shows examples of simulation waveforms that demonstrate energy recovery using SI-PSR in accordance with one embodiment. For this circuit, two load capacitances sharing the same inductor for SI-PSR are driven with non-overlapping inputs at 1.25 GHz. In one example, the inverters' outputs are in series with a shared SI-PSR inductor of about 0.7 nH. The other terminal of the inductor is connected to a bias supply, $V_{LB}$.

FIG. 4B illustrates a 90 nM CMOS time-domain simulation of energy recovery at the output of an example circuit, complemented by further pull-up by Vdd in accordance with one embodiment. The trace colors correspond to different values of $L_{SHARED}$.

For RDL, a SI-PSR-style circuit structure can be implemented in the dynamic logic cells across many instances. The total power can be estimated for comparative analysis as follows, where Q is the quality factor of the resonant circuit:

$$P_{RDL} = \frac{1}{2}(1-\alpha)(1-e^{-\pi/Q})CV_{DD}^2 f_{CLK} + \frac{n+1}{33}\alpha CV_{DD}^2 f_{CLK}$$

In comparison, for alpha=0.5, and for a realizable Q≥pi, RDL power is a third of standard domino logic power and 50% less than standard static logic. Thus, the advantages of dynamic logic's fastest processing are realized without the power penalty, by using RDL.

Table II summarizes the power savings for a two-inverter circuit.

TABLE II

Total Power and Power Savings for Examples with Two Independent Inverters

| | Non-overlapping inputs | Half-overlapping inputs | Overlapping inputs |
|---|---|---|---|
| with Simple Inverters | 4.43 mW | 4.43 mW | 4.43 mW |
| with SI-PSR inverters with shared inductor | 2.43 mW (45% savings) | 2.6 mW (41% savings) | 3.4 mW (23% savings) |

RDL applied to N-P Domino Logic: FIG. 5 illustrates a variation of the Domino method "N-P Domino CMOS logic" in accordance with one embodiment. Here, a PMOS pull-up network (PUN) follows each PDN stage, thus the circuit 550 alternates between PDN stages 551, 552 and PUN stages 560. The drawback here is the extensive and unappealing use of PMOS for the evaluation stage (for every other stage). Furthermore, the N-P Domino circuit 550 requires the use of inverters to provide an inverted clock input clk ("clk bar", or $\overline{clk}$)) and drive long lines (and therefore drive large $C_L$'s). In one example, NMOS are precharged High (logic 1) and the PMOS are precharged Low (logic 0). This reduces inverters and area needed. The PMOS logic tree has a lower speed. Trn is the input pulse width (Tr) for a nth stage and Trm is the Tr for a mth stage. L1 and L4 are a shared inductor. L2 and L3 are a shared inductor.

N-P Domino logic avoids unwanted charging and discharging of subsequent logic stages by alternating NMOS PDNs with PMOS PUNs. To recover energy using SI-PSR, inverters are replaced by an SI-PSR circuit on many or all inverter instances. This is shown in FIG. 5. Here, a cumulative (aggregate) $C_L$ that is large enough to resonate with a single, shared inductor $L_{SHARED}$ of about 0.5 nH, so that the resonant frequency of the series LC tank is about three times the maximum clock frequency of the driver circuits.

Shared inductor Pulsed Series Resonance (SI-PSR) is a building block for energy recycling in dynamic data circuits: To further discuss SI-PSR for this disclosure, additional figures are presented here. FIG. 6 is a topological diagram of SI-PSR, and FIG. 7 shows an example of a pulse driver circuit that can be used to implement the pulse timings and supply biases for SI-PSR.

FIG. 6 shows a topology for the Pulsed. Series Resonance driver (SI-PSR) circuit, showing an inductor in series with a switch at the output node, isolating the inductor while the STORE/RECOVER switches are open.

FIG. 6 illustrates an example of a digital logic driver circuit 600 that has shared inductor pulse series resonant (SI-PSR) for a case with n independent circuits.

Continuing with SI-PSR, consider a wide-frequency-range series resonant pulse driver, where the inductor $L_{ss}$ is periodically connected to load capacitance (e.g., $C_{L1}$, $C_{L2}$, ... $C_{Ln}$) with controlled input pulse width $T_{RES}$ (where $T_{RES}$ is also denoted as "$T_R$" for shorthand). An output (Vout1, Vout2, ... Voutn) has a pulse of width $T_{RES}$ (also denoted as "$T_R$" for shorthand) driving a higher capacitive load at resonance. For a substantially ideal inductor ($Q_L \gg 10$), both input and output are from 0 to $V_{DD}$. Controlled by the input pulses for the STORE/RECOVER switches, the bottom switches S1, S2, ... Sn close for pulse durations corresponding to their $T_R$, making the outputs go low for the respective circuits 610, 612, and 620. The series inductor allows the energy stored on the load capacitor to be transferred to the $V_{LB}$ node and then recovered back immediately to make the output go high. This creates a pulsed-voltage waveform at the Out node, whose initial stored charge enters the $V_{LB}$ node (and then immediately returns) through the series-resonant inductor, with a resonance period $T_{RES}$, in the form of a discharging current followed by a re-charging current. Thus, the current's action in this SI-PSR example is "recoil-like" (or "rebound-like"), and takes place during the initial oscillation of a discharging-and-recharging tank circuit having one or more connected output nodes that are initially high (initially "logic 1"). Therefore, energy can be recycled with the series LC resonant tank ($f_{RES}=1/2\pi\sqrt{L_{SS}C_L}$) formed when the NMOS is closed, i.e., reused to energize one or more output nodes from 0→1 (or partially, from 0→1). For this equation, the term $L_{SS}$ represents in shorthand the shared series inductor, and $C_L$ represents the aggregate load capacitance of the outputs. Because of this, the pull-up PMS switch does not need to charge the output to $V_{DD}$ all the way from 0 V. Such a shared-inductor pulsed series resonance (SI-PSR) topology can also use bond wire inductors or off-chip inductors not shown in this example embodiment.

The input signal stream is required to have a certain width ($T_R$) to generate a resonant pulse stream at the output. Referring again to FIG. 4B, this illustration shows the input and output timing waveforms for the SI-PSR circuit. The energy recovery process is done through the inductor current in resonant mode.

When input signals are high, the resonant tank is formed; and when low, the driver is in non-resonant mode. The resonance time is $T_{RES}=2\pi\sqrt{L_{SS}C_L}<T_{CLK}$. Several advantages result from this. When operating with narrow output pulses, $T_{RES}$ is always less than the period $T_{CLK}$, and is thus valid for operation across a wide range of frequencies (e.g., 1 MHz to 1 GHz, 1 MHz to 10 GHz, etc.), and thus across DVFS. From a circuit design perspective, the input signal (with required $T_{PW}$) can be derived from the regular clock using circuitry 700 shown in FIG. 7.

In FIG. 7, the input pulse stream is applied with the system clock period $T_{CLK}$ and has a generated pulse-width of $T_{PW}$ for series resonance operation. Embodiments of the present invention automatically generate the correct $T_R$, as described later. Input pulse widths $T_R$ must be larger than damped oscillation cycle $T_R$ for a given SI-PSR circuit. The voltage $V_C$ on the capacitor $C_L$ ($Q_C$>30) typically does not swing rail-to-rail. Extra power is needed to restore $V_C$ to logic high (near $V_{DD}$ rail). The width of input pulses ($T_{PW}$) can be designed to be sufficient to allow the inductor current waveform to go through a complete resonance cycle $T_R=1/f_R$, to optimize the possible energy that can be recovered. The output voltage swings by itself until a certain voltage recovery point, without drawing current from $V_{DD}$ power supply. Moreover, the charging and discharging waveforms are substantially adiabatic in nature, thus minimizing transfer losses.

The resonance time, designated as $T_{RES}$, is given by $2\pi\sqrt{L_{SS}C_L}$. $T_R$ should thus ideally be of $T_{RES}$ duration, basically the period of resonance for large Q. This period ($T_{RES}=1/f_{RES}$) can be set at a third of maximum $T_{CLK}$ or less. As an example, for a 1 pF load at 1 GHz clock rate, $T_{RES}$ can be set to 0.2 ns using a 1 nH inductor, resulting in a 5 GHz resonance frequency.

The overall performance can be viewed along with pulse-based data-capture flip-flops (data latches) that take lower power than regular master-slave flip-flops. The SI-PSR-based pulse generator solution (described in this disclosure) conveniently generates the required pulses for these energy-saving flip-flops (data latches) while consuming less power than earlier methods.

FIG. 7 shows an embodiment for generating the control clock width $T_{PW}$ for SI-PSR without disrupting a signal path. This circuit 700 is a pulse generator with controlled width including a voltage doubler to increase the drive on the NMOS switch whose source is a higher bias voltage than normal ground. The circuit 700 shown in FIG. 7 can be duplicated (two of same or two of similar circuits) where the first of said circuits generates a $T_R$ pulse of a given phase (i.e., of a given timing position and timing duration within a clock cycle), and the second of said circuits generates a $T_{PW}$ pulse of a second, controllable phase, where said second phase may be nonoverlapping, partially overlapping, or fully overlapping. A modification of this two-phase circuit provides nonoverlapping pulses without further timing control, or with limited timing control, of the second-phase $T_{PW}$ pulse.

FIG. 7 illustrates an embodiment for controlling clock parameters without disrupting critical signal paths.

Continuing with FIG. 7, an optimum delay of approximately $T_R$ is generated from the RLC and inverter in the input stage.

The series inductor ($L_D$) in FIG. 8 is a replica of $L_{SS}$, and matching capacitance $C_{M1}$ tracks the average load $C_L$. The pulse width, $Tr\le\sqrt{L_{SS}C_L}$, is determined by $\sqrt{L_DC_{M1}}$. The inductor s chosen large enough so that $T_R=2\pi\sqrt{L_{PW}(C_{Mr}+C_{M2})}$ is slightly larger than $T_R$. Matched delays create pulse widths that are replicas of load capacitance resonance times. Here, $C_{Mr}$ is the non-negligible gate capacitance of the inductor switching transistor. As an example, the inherent gate capacitance for the inductor switching transistors 509a, 509b as depicted in the scheme shown in FIG. 4A. $C_{M2}$ is also matched to $C_L$ as well as $C_{M1}$. This replica timing eliminates the need for synchronization with conventional DLL/PLL circuitry that would otherwise have required more area and power.

Repeated low-going pulses are generated from both the edges of the input CLOCKin of FIG. 7 using an XNOR gate and the replica delayed signal. The XNOR output can be inverted to obtain and inverted $V_{SR}$ signal. Thanks to the Miller gain around $C_{M1}$ buffer, it is not necessary to have the entire load capacitance duplicated for a replica delay. This saves power in charging and discharging this capacitor as well. For run-time tuning, accounting for inductor and load capacitance variations, the variable resistor $R_{opt}$ can be tuned to adjust the RLC delay and change $T_R$ appropriately. $C_{M1}$ and $C_{M2}$ can be varied to match the loads used, during die to die calibrations.

Continuing further with FIG. 7, the NMOS switch on-resistance, for the same device size as NR (non-resonance mode), will be higher due to bias voltage of $0.5V_{DD}$ at the NMOS source node. The drain-source resistance (switch on-resistance) is inversely proportional to gate-source voltage $V_{gs}$ as seen in by the standard formula $1/2\ \mu C_{OX}W(V_{gs}-V_t)$, where $\mu C_{OX}$ can be considered a constant and l is the fixed transistor channel length. While $V_{gs}$ is full gate voltage of $V_{DD}$ in the NR case, in SI-PSR it is only half that, as the source is now biased at $0.5V_{DD}$. Transistor width (W) can be increased to compensate for this but will increase area and capacitance. Another alternative is to drive the gate ($V_g$) with double the voltage. Resonant techniques can also be used to drive the $V_{SR}$ line itself. A low-power voltage doubler scheme for $V_{SR}$ is shown in FIG. 7 that uses pulsed resonance technique. A pulse-resonance-based PMOS driver is used as a voltage doubler. When the PMOS switch is closed, the inductor series resonates with the capacitance $C_{M2}$ and $C_{Mr}$. Due to the additional $C_{Mr}$ driver gate capacitance, the series inductor $L_{PW}$ needs to be scaled with respect to $L_D$, to give the pulse width of $0.5T_R$ timing needed at $V_{SR}$.

Applications to Dynamic Data Latches and Flip-Flops: Furthering our discussion regarding energy recovery in dynamic logic circuits and data circuits, dynamic D-latches are also considered for enhancement with SI-PSR.

For a circuit 800 of FIG. 8A, showing n flip-flops, the operation of a given flip-flop occurs as follows, without considering SI-PSR at the moment: With φ1 high, the Stage1 switch 810 is closed and the D1 input gets stored on the capacitance C1 (=Cgate of Inverter1 [called "$I_{11}$"] and the Cdiffusion of the first NMOS switch for φ1). With the φ2 high, the Stage1 switch 810 opens, the stage2 switch 820 closes, and the complement of the value stored on CL1 now gets transferred to and stored on C2 (=Cgate of I2 and the Cdiffusion of Inverter 2 (called "$I_{12}$"). Note that φ1 is like a pre-charge clock, whose duration should be long enough to allow proper data transfer, i.e., pre-charging of the worst-case node in the stage 1 part of the circuit. And, also notice that the delay between the clocks should ensure that even for the worst-case skew between the clocks, their phases φ1 and φ2 should not overlap. The data transferred includes random non-repetitive data during certain time periods and possibly has repetitive data during other time periods.

FIG. 8A shows resonant dynamic logic (RDL) as applied to flip-flops. For this disclosure, the term "flip-flop" is synonymous with "latch". Transmission gates can be used instead of NMOS gates, in one or more (any or all) instances.

Now, considering FIG. 8A with SI-PSR, energy is stored and recovered through a series resonant circuit 800 formed by the aggregate capacitance of the output nodes in series with a shared inductor $L_{SS}$. The other terminal of $L_{SS}$ is connected to a bias supply $V_{LB}$. The clock phases φ1 and φ2 in this example are non-overlapping. Many latches can share the same inductor. For examples, n could be 1, 10, 128, 1000, 10,000, 32K, or 64K, as realistic numbers (for example, $D_1$, $D_{10}$, $D_{128}$, $D_{1000}$, $D_{10000}$, $D_{32K}$, or $D_{64K}$, or higher).

FIG. 8B shows a circuit 850 of SI-PSR that is similar to FIG. 8A, but the internal stages are connected to the output stages, further sharing $L_{SS}$. One or more internal stages can be connected to $L_{SS}$, thereby sharing the inductor $L_{SS}$ as determined by the circuit designer and/or by the requirements of the circuits.

FIG. 8B shows resonant dynamic logic (RDL) as applied to flip-flops. For this disclosure, the term "flip-flop" is synonymous with "latch". For the case shown, the internal stage node is connected to the driving stage, and is further connected to one terminal of inductor $L_{SS}$. Compare this figure to FIG. 8A. Any or all nodes, internal stage and/or driving stage, can be connected one terminal of the shared inductor.

Reduced sensitivity to skew and improve timing closure: The use of PSR for clocks in conjunction with shared inductor pulse series resonance (SI-PSR) for logic circuits and for latches helps to synchronize the clock and data, and helps reduce sensitivity to skews. This technology inherently gives better timing closure. Timing closure and negative set-up time: For the circuits in FIGS. 8A and 8B, simple switches are used instead of transmission gates (TGs). In addition, LSHARED (called $L_{SS}$) on I2 shows a negative "set-up time," therefore timing closure improves.

Further applications of RDL to logic circuit families: RDL applied to Pseudo 2-phase dynamic logic, and applied to Pseudo 2-phase Domino logic. Shifting our attention back to discussing logic circuits, the RDL concept can be applied to a variety of logic families, including Pseudo 2-phase dynamic logic 1000, and applied to Pseudo 2-phase Domino logic 900. This is shown in FIGS. 9 and 10, respectively. The shared PSR inductor and bias can be placed in series with the NMOS transistors shown in FIG. 9. Similarly, the SI-PSR inductor and bias can be placed in series with any combination of inverter NMOS transistors and/or NMOS pull-down transistors.

FIG. 9 illustrates an example of pseudo 2-phase domino resonant dynamic logic 900 (RDL). SI-PSR can be implemented in series with any combination of NMOS pull-down switches. The domino logic circuit 900 includes a first stage 910 coupled to Lss 912 and a second stage 920 coupled to Lss 922. The first stage 910 receives a φ1 clocking signal that is illustrated with waveform 950 and the second stage 920 receives a φ2 clocking signal that is illustrated with waveform 960. Waveform 950 includes input pulses Tr. The X1 is transparent and stage 910 pre-charges during a time period of the input pulse Tr. During a next time period of waveform 950, X1 is turned off and stage 910 evaluates the inverted input phi1 signal. Waveform 960 includes input pulse Tr. The X2 is transparent and stage 920 pre-charges during a time period of the input pulse Tr. During a next time period of waveform 960, X2 is turned off and stage 920 evaluates the inverted input φ2 signal.

FIG. 10 illustrates a Pseudo 2-phase dynamic resonant dynamic Logic (RDL) 1000 in accordance with one embodiment. SI-PSR can be implemented in series with any combination of NMOS pull-down switches and/or NMOS transistors of the inverters. The dynamic logic circuit 1000 includes a first stage 1010 coupled to Lss 1012 and a second stage 1020 coupled to Lss 1022. The first stage 1010 receives a φ1 clocking signal that is illustrated with waveform 1050 and the second stage 1020 receives a φ2 clocking signal that is illustrated with waveform 1060. Waveform 1050 includes input pulses Tr. The stage 1010 pre-charges during a time period of the input pulse Tr. During a next time period of waveform 1050, stage 1010 evaluates the inverted input φ1 signal. Waveform 1060 includes input pulses Tr. The stage 1020 pre-charges during a time period of the input pulse Tr. During a time period prior to the input pulse Tr and also subsequent to the input pulse Tr of waveform 1060, stage 1020 evaluates the inverted input φ2 signal.

Although this invention has been described with reference to particular embodiments and examples, other modifications and variations will occur to those skilled in the art in view of the above teachings. It should be understood that, within the scope of the appended claims, this invention may be practiced otherwise than as specifically described.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. § 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the invention.

What is claimed is:

1. A digital logic driver comprising:
   an output node;
   a first load capacitance of the output node; and
   a resonant inductor intermittently coupled to the first load capacitance to resonant during a resonant mode, the resonant inductor has a reduced size due to being shared with multiple digital logic drivers, wherein the digital logic driver reuses electrical energy at several load capacitances including the first load capacitance and a second load capacitance, as part of a signal path of the digital logic driver without interfering with the signal path of the output node, wherein the resonant inductor is intermittently connected to at least one of the load capacitances for an optimum duration such that as the output node transitions from a logic high state to a logic low state and magnetic energy is established in the resonant inductor and stored in a power supply, and then recovered by way of the resonant inductor to help transition the output node back to the logic high state from the logic low state.

2. The digital logic driver of claim 1, wherein the resonant inductor includes a first terminal that is capable of being connected in series with the first and second load capacitances.

3. The digital logic driver of claim 1, wherein the resonant inductor includes a second terminal that is connected in series with a bias supply.

4. The digital logic driver of claim 1, wherein the output node is driven with a data signal between low and high states in a random non-repetitive manner for a time period.

5. The digital logic driver of claim 1, wherein the output node is driven with a data signal between low and high states in a random non-repetitive manner for a time period.

6. The digital logic driver of claim 1, wherein the resonant inductor resonates with at least one of the load capacitances for a resonance time that is valid for operation of the digital logic driver across a wide range of frequencies from 1 MHz to 1 GHz.

7. The digital logic driver of claim 1, wherein the resonant inductor resonates with at least one of the load capacitances for a resonance time that is valid for operation of the circuit system across a wide range of frequencies from 1 MHz to 10 GHz.

8. The digital logic driver of claim 1, wherein the resonant inductor has a value of about 0.5 to 0.7 nano Henry.

* * * * *